Patented Apr. 19, 1949

2,467,373

UNITED STATES PATENT OFFICE 2,467,373

PRODUCTION OF NITRILES

Harris A. Dutcher, Borger, Tex., and I. Louis Wolk, Bartlesville, Okla., assignors to Phillips Petroleum Company, a corporation of Delaware No Drawing. Application September 18, 1944, Serial No. 554,716

14 Claims. (Cl. 260—465.9)

This invention relates to a process for the production of nitriles. The process of the invention is particularly useful for the manufacture of acrylonitrile.

The present invention provides a method of producing saturated and unsaturated nitriles from alkyl and alkenyl halides. In accordance with the process of our invention the halide used as starting material is admixed with hydrogen cyanide and reacted therewith at an elevated temperature. The reaction produces the alkyl or alkenyl cyanide, corresponding to the original starting material, as will be further explained hereinafter. Hydrogen halide is liberated by the reaction. This process is particularly suited for the manufacture of acrylonitrile from vinyl chloride.

An object of this invention is to provide a continuous process for the manufacture of nitriles by reaction of aliphatic chlorides with hydrogen cyanide. Another object of the invention is to provide such a process in which an unsaturated nitrile may be produced from an alkenyl halide. Still another object of this invention is to provide an improved process for the production of acrylonitrile.

In accordance with the present invention, unsaturated aliphatic nitriles are produced by reaction of an alkenyl halide with hydrogen cyanide at an elevated temperature. Since hydrogen halide is produced as a by-product of the reaction, the reaction might be considered to be dehydrohalogenation followed immediately by the addition of hydrogen cyanide to the hydrocarbon radical. However the reaction actually occurs, the overall effect of the reaction is the substitution of HCN for HCl. Thus, for example, the dehydrochlorination of vinyl chloride in the presence of hydrogen cyanide in accordance with the present invention leads to the formation of acrylonitrile according to the equation:

$$CH_2=CHCl + HCN \rightarrow CH_2=CH-CN + HCl$$

The process is applicable also to dihaloalkanes, which upon dehydrohalogenation in the presence of hydrogen cyanide produce the unsaturated nitrile. The beta-halogen saturated nitrile may be formed as an intermediate. This compound is dehydrohalogenated to form the unsaturated nitrile. For example, ethylene chloride, 1,2-dichloro ethane, may be dehydrochlorinated in the presence of hydrogen cyanide to produce acrylonitrile. This reaction may be considered as taking place in two steps. The ethylene chloride reacts with the hydrogen cyanide to produce the 2-chloro propionitrile and hydrogen chloride. The 2-chloro propionitrile is then dehydrochlorinated to acrylonitrile. These reactions are represented in the following equations:

$$CH_2Cl-CH_2Cl + HCN \rightarrow CH_2Cl-CH_2CN + HCl$$
$$CH_2Cl-CH_2CN \rightarrow CH_2=CH-CN + HCl$$

The method may be applied to the production of the higher nitriles from starting materials having three or four carbon atoms per molecule. The reaction of hydrogen cyanide with propenyl chloride and butenyl chloride to form the corresponding nitriles in accordance with the process of this invention proceeds more readily than does the reaction with vinyl chloride, i. e., the reaction may be carried out at lower temperature. More by-products result when the higher alkyl and alkenyl chlorides are used as starting material.

The reaction is carried out either in the presence or absence of a catalyst under conditions which favor dehydrohalogenation of the starting material. These conditions are dependent upon the starting material and the nature of the catalyst, if any is employed. When the starting material is a monohalide, only one molecule of hydrogen halide is split out. Temperatures within the range of 350 to 750° C. are suitable for carrying out the reaction with the monohalide. Somewhat higher temperatures may be necessary if it is desired to employ ethylene chloride (1,2-dichloro ethane) or other dihaloalkanes as starting materials for production of the corresponding unsaturated nitrile. Such temperatures are in the range of 450 to 800° C. Higher temperatures are required for the non-catalytic conversion than is required for catalytic conversion. The proportion of hydrogen cyanide in the initial mixture may be varied over rather wide limits, but is advantageously kept somewhat in excess of the alkyl or alkenyl halide so as to favor the desired addition reaction. The reaction may be carried out in a heated tube in the absence of a catalyst or in a suitable chamber filled with catalyst. In either case, the halide may be passed through the reaction zone in a continuous stream and hydrogen cyanide introduced into said stream at a plurality of points.

Flow rates of 0.5 to 2.5 liquid volumes of charge stock per volume of catalyst per hour give satisfactory yields of nitriles. Reaction times of about 10 to 50 seconds are preferred for the non-catalytic conversion of the chlorides to nitriles.

The reaction may be carried out under a wide range of pressure conditions. Low pressures are generally most satisfactory. Pressures approximately equal to and slightly above atmospheric pressure give good results and are preferred in most instances. However, higher pressures may sometimes be used advantageously, particularly with the higher molecular weight starting materials, to suppress undesirable side reactions.

Catalysts suitable for use in the present process are the halides of copper, lead, calcium, zinc, cadmium, aluminum, tin, manganese, nickel, iron, cobalt and bismuth. Surface active materials, such as silica gel, active carbon, pumice, alumina and the like are satisfactory as catalysts for the process.

A hydrogen chloride acceptor may be used to remove free hydrogen chloride from the reaction products as it is liberated. The removal of hydrogen chloride promotes the desired reaction in accordance with the well known principles of the law of mass action. Unsaturated hydrocarbons which react with hydrogen to form stable compounds at the reaction temperature are suitable as hydrogen chloride acceptors. Acetylene is especially suited for use as a hydrogen chloride acceptor since it reacts with the hydrogen chloride to form additional vinyl chloride for the reaction.

To prevent polymerization and side reactions or reversal of the reaction, the effluents of the reaction are preferably quenched to a temperature below the reaction temperature. This may be readily accomplished by contacting the effluent stream of hydrocarbons with water or high boiling hydrocarbons, particularly paraffins. When water is used as a quenching medium, the acrylonitrile is dissolved in the water, together with the hydrogen chloride and hydrogen cyanide. The unreacted vinyl chloride is undissolved and may be recycled. The dissolved acrylonitrile forms an azeotrope with water which may be separated from hydrogen cyanide and the hydrogen chloride azeotrope by fractional distillation. With the high boiling paraffin hydrocarbons as quenching medium, the acrylonitrile is absorbed while the hydrogen chloride, and unreacted vinyl chloride and hydrogen cyanide are substantially insoluble.

The following examples illustrate more fully the process of this invention:

*Example I*

A stainless steel tube six inches in diameter and five feet in length is filled with granular silica gel of 8-14 mesh. The catalyst bed is preheated to a temperature of about 500° C. by contact with a hot oxygen-free flue gas flowed therethrough at a somewhat higher temperature. A mixture of vinyl chloride and hydrogen cyanide, in the ratio of about four parts by weight of vinyl chloride to one part of hydrogen cyanide is preheated to a temperature of about 500° C. and is passed through the hot catalyst bed at a flow rate of about 350 cubic feet of gaseous feed per hour. This is approximately one liquid volume of feed per volume of catalyst per hour. The effluent vapors are quenched to a temperature of about 100° C. by contact with a spray of a 35° A. P. I. Mid-Continent gas oil. The gas oil containing product dissolved therein is then heated to distill off a product boiling between 75 and 80° C. On analysis this product is found to consist primarily of acrylonitrile. Unconverted hydrogen cyanide and vinyl chloride not absorbed in the oil are recycled to the process.

*Example II*

A reaction is carried out in the apparatus described in Example I using granular bauxite of 8-14 mesh size as contact material. A mixture of five parts by weight of vinyl chloride to one part of hydrogen cyanide is passed through the catalyst admixed with a small proportion of acetylene which represents about 10% of the weight of the feed. A reaction temperature of 450° C. is provided by preheating the catalyst to this temperature with a stream of hot nitrogen gas and the feed is preheated by passing through a preheating furnace. The flow rate is about 400 cubic feet of gaseous feed per hour. The effluent products are quenched with a spray of water and water solution of acrylonitrile contaminated with hydrogen cyanide and other reaction products is recovered. This solution is distilled to separate an azeotropic mixture of acrylonitrile and water from which on cooling, an oily layer of acrylonitrile separates.

The invention also contemplates the formation of the halogenated hydrocarbons used in the process from an olefin and a halogen, and the utilization of the hydrogen halide formed as a source of the halogen required. Also, the unsaturated halogenated hydrocarbon may be produced from an acetylenic compound by the addition of hydrogen halide thereto. Ethylene chloride may be formed, for example, by chlorination of ethylene in known manner, and vinyl chloride likewise by addition of HCl to acetylene. Vinyl chloride may also be formed by dehydrohalogenation of ethylene chloride. Thus, ethylene, an abundant and inexpensive petroleum chemical, may be used as a raw material for acrylonitrile synthesis.

It is obvious that our invention is not limited to the specific compounds mentioned by way of illustration, but is broadly applicable to the process of dehydrohalogenation of halogenated hydrocarbons in the presence of hydrogen cyanide, with the formation of saturated and/or unsaturated nitriles, or of their halogenated derivatives.

We claim:

1. A process for the preparation of acrylonitrile which comprises admixing vinyl chloride with hydrogen cyanide and contacting the resulting mixture in vapor phase at a temperature within the range of 350 to 800° C. with a dehydrohalogenation catalyst in the presence of acetylene as hydrogen chloride acceptor effecting reaction of hydrogen cyanide with vinyl chloride to form acrylonitrile.

2. A process for the preparation of acrylonitrile which comprises admixing vinyl chloride with hydrogen cyanide in the ratio of about four parts vinyl chloride to one part hydrogen cyanide, and contacting the resulting mixture at about 500° C. with granular silica gel effecting reaction of hydrogen cyanide with vinyl chloride to form acrylonitrile.

3. A process for the preparation of acrylonitrile which comprises admixing vinyl chloride with hydrogen cyanide and subjecting the resulting mixture in vapor phase to a temperature within the range of 350 to 800° C. effecting reaction of hydrogen cyanide with the vinyl chloride to form acrylonitrile.

4. A process for the preparation of acrylonitrile which comprises admixing ethylene chloride with hydrogen cyanide and subjecting the resulting mixture in vapor phase to a temperature within the range of 350 to 800° C. effecting reaction of hydrogen cyanide with ethylene chloride and simultaneous dehydrochlorination to form acrylonitrile.

5. A process for the preparation of acrylonitrile which comprises admixing vinyl chloride with hydrogen cyanide, subjecting the resulting mixture in vapor phase to a temperature within the range of 350 to 800° C. in a reaction zone, introducing additional hydrogen cyanide into said mixture at a plurality of points in said reaction zone, quenching the effluent of said reaction zone with water, and separating acrylonitrile from said water.

6. The process which comprises reacting hydrogen cyanide with an aliphatic halide containing from 2 to 4 carbon atoms and selected from the group consisting of dihaloalkanes and alkenyl monohalides in vapor phase at a temperature within the range of 350 to 800° C. effecting reaction of hydrogen cyanide with the aliphatic halide to form the corresponding unsaturated nitrile.

7. A process as defined in claim 6 wherein said dihaloalkanes are dichloroalkanes and said alkenyl monohalides are alkenyl monochlorides.

8. The process which comprises reacting hydrogen cyanide with an aliphatic halide containing from 2 to 4 carbon atoms and selected from the group consisting of dihaloalkanes and alkenyl monohalides in vapor phase at a temperature within the range of 350 to 800° C. in the presence of a dehydrohalogenation catalyst effecting reaction of hydrogen cyanide with the aliphatic halide to form the corresponding unsaturated nitrile.

9. The process of claim 8 in which the dehydrohalogenation catalyst is a metal halide.

10. The process of claim 8 in which the dehydrohalogenation catalyst is a surface active catalyst selected from the group consisting of silica gel, active carbon, and alumina.

11. The process of claim 8 in which the dehydrohalogenation catalyst is silica gel.

12. The process as defined in claim 6 wherein said dihaloalkanes are dichloroalkanes and said alkenyl monohalides are alkenyl monochlorides and wherein the reaction is carried out in the presence of an unsaturated hydrocarbon effective as a hydrogen chloride acceptor.

13. The process which comprises reacting in vapor phase hydrogen cyanide with an aliphatic halide containing from 2 to 4 carbon atoms and selected from the group consisting of dihaloalkanes and alkenyl monohalides by passing such an aliphatic halide in a continuous stream through a reaction zone maintained at temperatures within the range of 350 to 800° C. and introducing hydrogen cyanide into said stream at a plurality of points, effecting reaction of hydrogen cyanide with the aliphatic halide to form the corresponding unsaturated nitrile.

14. A process for the preparation of acrylonitrile which comprises reacting vinyl chloride with hydrogen cyanide in vapor phase at a temperature within the range of 350 to 800° C . in the presence of acetylene as hydrogen chloride acceptor effecting reaction of hydrogen cyanide with vinyl chloride to form acrylonitrile and hydrogen chloride and reaction of the latter with acetylene to form additional vinyl chloride, recovering acrylonitrile product from the reaction mixture, and recovering vinyl chloride from the reaction mixture and recycling same to the reaction.

HARRIS A. DUTCHER.
I. LOUIS WOLK.

REFERENCES CITED

The following references are of record in the file of this patent:

UNITED STATES PATENTS

| Number | Name | Date |
|---|---|---|
| 1,851,040 | Fikentscher et al. | Mar. 29, 1932 |
| 2,097,155 | Groll et al. | Oct. 26, 1937 |
| 2,210,320 | Kautter et al. | Aug. 6, 1940 |
| 2,288,580 | Baehr | June 30, 1942 |
| 2,316,215 | Austin | Apr. 13, 1943 |
| 2,342,101 | Cass et al. | Feb. 22, 1944 |
| 2,385,549 | Spence | Sept. 25, 1945 |

FOREIGN PATENTS

| Number | Country | Date |
|---|---|---|
| 363,009 | Great Britain | June 19, 1931 |
| 463,123 | Germany | July 23, 1928 |
| 559,734 | Germany | Sept. 23, 1932 |

OTHER REFERENCES

Beilstein (4th Ed.), vol. 1, p. 229 (1918).
Ellis, "Chemistry of Petroleum Derivatives," (Chem. Catalog Co., 1934), page 473.
Breckpot, Bull. Soc. Chim. Belg., vol. 39, pp. 462–469 (1930).
Beilstein (4th Ed., 2nd suppl.), vol. 1, p. 210 (1942).